J. G. OLIVER.
SEED PLANTER.
APPLICATION FILED AUG. 12, 1911.
1,019,691.
Patented Mar. 5, 1912.
3 SHEETS—SHEET 1.
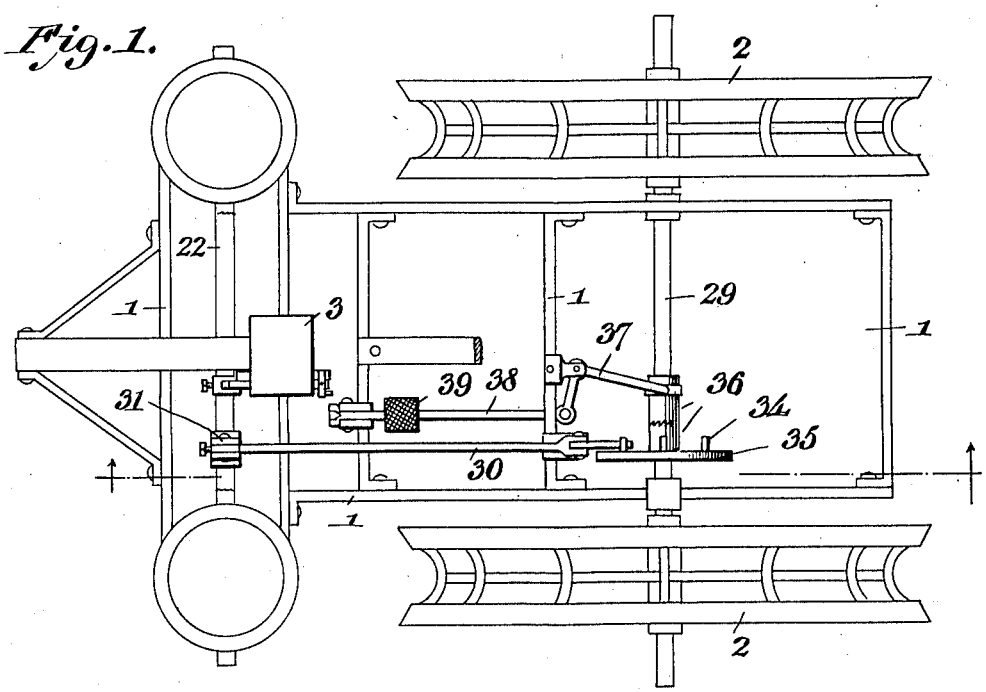
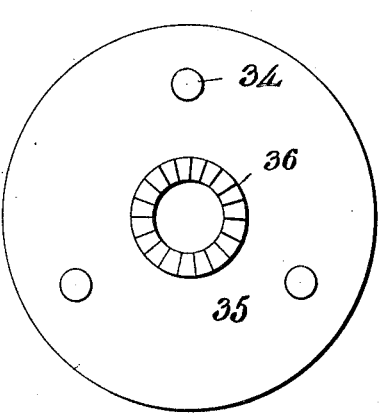
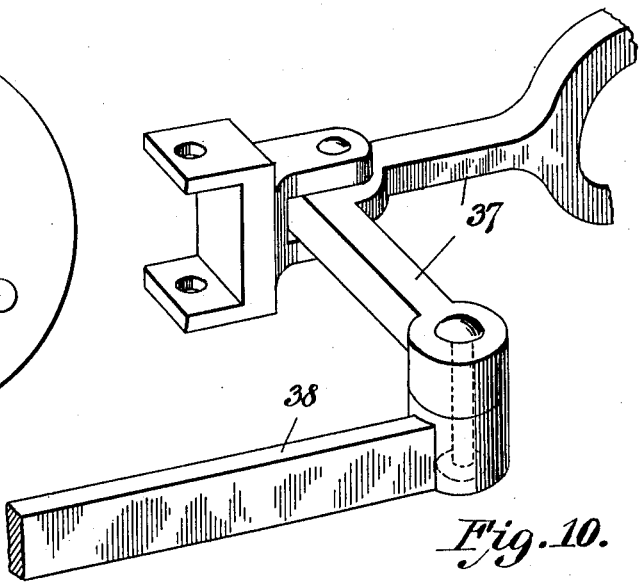
WITNESSES
INVENTOR
James G. Oliver.
Attorney

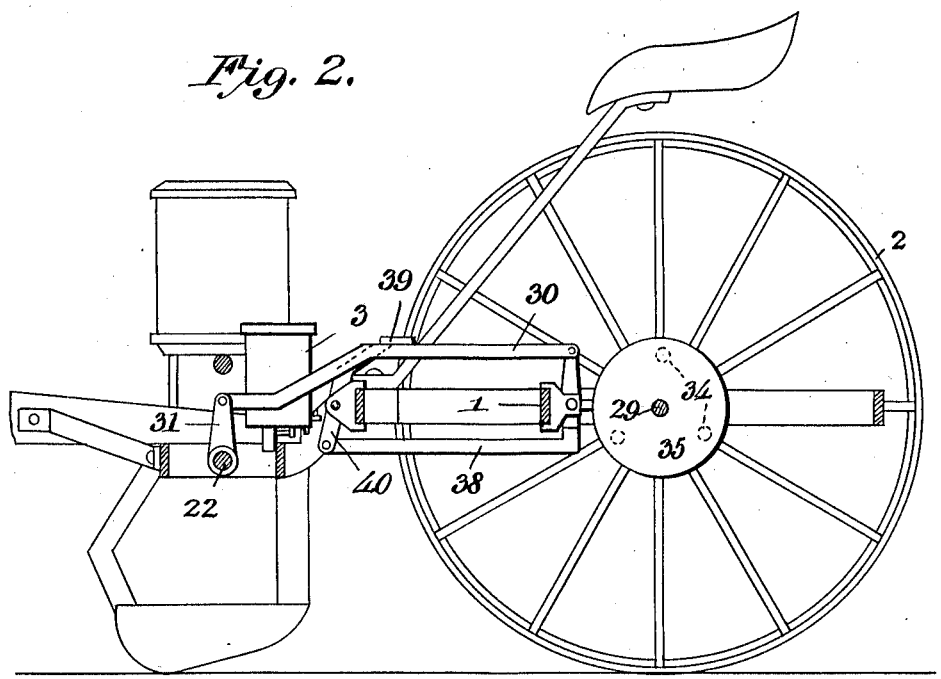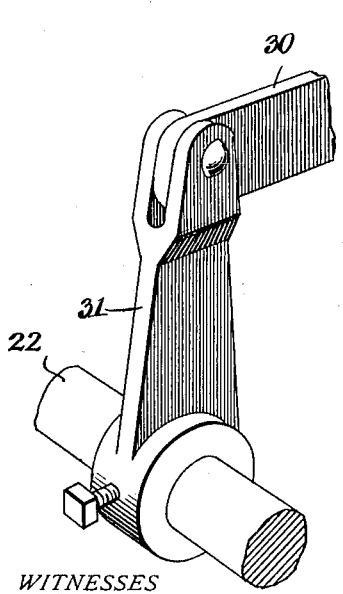

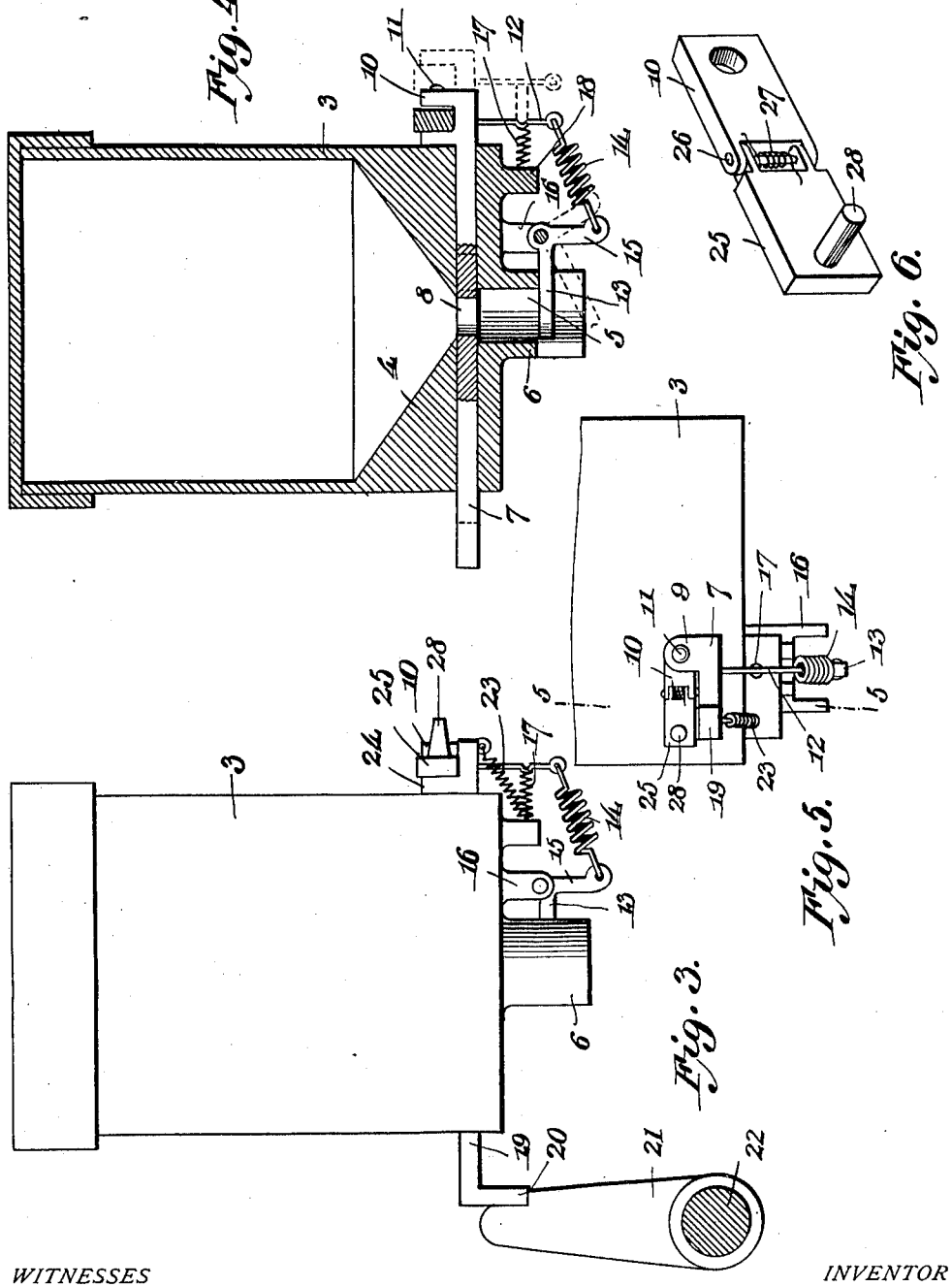

UNITED STATES PATENT OFFICE.

JAMES G. OLIVER, OF ALLIANCE, NEBRASKA.

SEED-PLANTER.

1,019,691.   Specification of Letters Patent.   Patented Mar. 5, 1912.

Application filed August 12, 1911. Serial No. 643,756.

*To all whom it may concern:*

Be it known that I, JAMES G. OLIVER, a citizen of the United States of America, residing at Alliance, in the county of Box- butte and State of Nebraska, have invented certain new and useful Improvements in Seed-Planters, of which the following is a specification.

The present invention relates to seed planters, particularly to corn planters and has for its purpose to provide a vehicle with means for dropping the seed through the medium of the travel of the vehicle, and thereby to avoid the complicated and unsatisfactory way of causing the seeds to be dropped through the agency of cords or wires arranged across the field, and having obstacles which effect the release and dropping of the seed.

It is the further purpose of the invention to provide an apparatus of the character in question which will be of simple construction, easy of operation, cheap to manufacture, and which may be readily repaired, if for any reason it should become out of order.

With these and other objects in view the invention consists in the arrangement and combination of parts hereinafter claimed, and while the invention is not restricted to the exact details shown and described, still for the purpose of disclosure reference is had to the accompanying drawings, in which like reference characters designate the same parts in the several views, and in which:—

Figure 1 is a top plan view of a vehicle equipped with the present invention. Fig. 2 is a side elevation thereof with parts in section. Fig. 3 is a side elevation of the hopper and seed releasing mechanism. Fig. 4 is a transverse sectional view thereof taken on the line 5—5 of Fig. 5. Fig. 5 is a rear elevation of the releasing mechanism. Fig. 6 is a perspective view of a detail thereof. Fig. 7 is a side elevation of the actuating disk. Fig. 8 is a perspective view of the tripping lever. Fig. 9 is a perspective view of the seed dropper actuating arm; and Fig. 10 is a detail perspective view of the clutch.

Referring to the construction in detail and wherein like reference characters indicate corresponding parts in the different views shown 1 designates the frame of the vehicle and 2 the traction wheels thereof. A seed hopper 3 is mounted on the frame 1 (see Figs. 1 and 2), and is designed to contain the grain or corn or other seed that is to be sown.

It is proposed to cause the seeds to be dropped from the hopper 3 at equal distances on the ground and in equal quantities, and to this end said hopper is provided with a tapering bottom 4 (see Fig. 4), which communicates with an outlet 5 provided by a collar 6. The outlet 5 is controlled by a slide 7 having an aperture that registers with said outlet. The slide 7 has an upward projection or arm 9 to which is pivotally mounted a latch 10 by means of a stud or pin 11. Said slide 7 is also provided with a downwardly disposed arm 12 that connects with a valve or seed regulator 13 through the medium of a spring wire 14, said spring wire being secured to an arm 15 of the valve 13. The valve 13 is pivotally mounted on a projection 16 to control the outlet through the passage-way 5. The arm 12 is further provided with a retraction spring 17 that connects with a projection 18 on the hopper 3, and operates to hold the slide 7 normally in that position shown in Fig. 4. In addition to the slide 7 the hopper is also provided with an idler slide 19 whose forward end is constructed with a downwardly projecting shoulder 20 adapted to be engaged by an oscillating arm 21 that is mounted on the shaft 22 of the vehicle (see Figs. 1 and 3). The slide 19 is likewise provided with a retraction spring 23 which normally holds said slide in its innermost position. At its rear end the slide 19 has an upwardly projecting portion 24 designed to engage with the latch 10 and force the slide 7 outwardly. This outward movement of the slide 7 closes off the opening 8 in said slide and the further movement thereof causes the valve 13 to be rotated on its pivot and thus allow the seed separated by said valve to be dropped. The inward movement of the slide 7 is then effected through the agency of the spring 17.

When it is desired to prevent the seed from being dropped it is necessary only to remove the connection between the slides. This connection consists in a latch 10, which has a part 25 hinged thereon by a pin 26 (see Fig. 6). A spring 27 on the pin 26 effects to hold the parts 10 and 25 of the latch ordinarily in substantially rigid relation, but permitting of yielding under unusual strain, the purpose whereof will be presently explained. A stud 28 serves to permit of the latch 10 being swung into or out of position on its pivot pin 11 as will be readily understood.

The object in having the resilient connection between the parts 10 and 25 is to allow of sufficient play or relative movement between said parts in the event that the slide 7 becomes jammed for any reason, such for instance as the clogging of seeds at the place of the opening 8 in said slide. In the event of such clogging, the slide 19 would in its ordinary movement, when the latch 10 is in position, simply effect to turn the part 25 on the hinge 26 and thus not break any of the parts.

The actuating shaft 22 is moved from the vehicle shaft 29 through the medium of the rod 30 which connects with the shaft 22 by an arm 31 (see Fig. 9). At its opposite end the rod 30 is pivotally secured to a bell-crank lever 32, which lever is in turn pivoted on a cross piece of the vehicle frame 1. An arm 33 of the bell-crank lever 32 constitutes a trip that is intermittently engaged and actuated by pins 34 carried on the disk 35 that is fixed to rotate with the vehicle shaft 29. From this description it will be apparent that the projections 34 engaging with the trip 33 will cause the rod 30 to be reciprocated, which in turn will oscillate the arm 21 and move the slide 19. And the slide 19 may move idly or in connection with the slide 7 through the agency of the latch 10.

To control the actuation of the disk 35 a clutch 36 is provided which may be coupled or uncoupled through a bell-crank lever 37 that is pivoted on the vehicle frame and has connection with a rod 38, which rod is in turn actuated through the medium of a treadle 39 of an arm 40 (see Fig. 2).

It is obvious that those skilled in the art may vary the details of construction and arrangement of parts without departing from the spirit of my invention, and therefore I do not wish to be limited to such features except as may be required by the claims.

What I claim as new and desire to protect by U. S. Letters Patent is:

1. In a seed planter the combination with a vehicle, of a hopper carried thereby and provided with an outlet opening; a slide controlling said outlet opening; a pivotally mounted valve connected with said slide and adapted to hold the seed for dropping; an idler slide mounted adjacent the first named slide; means for actuating the idler slide through the travel of the vehicle; a resilient latch pivotally mounted to said controlling slide; and means on said idler slide adapted to engage with said latch to actuate said controlling slide, substantially as described.

2. In a seed planter the combination with a vehicle, of a hopper carried thereby and provided with an outlet opening; a slide controlling the passage of seed through said opening; a pivotally mounted valve adapted to hold the seed released by said slide; a resilient connection between said slide and valve to actuate the latter through the movement of the former; an idler slide mounted adjacent the first named slide; a retraction spring for the idler slide; a hinged latch carried by the first named slide; and a member on the idler slide adapted to engage said latch and effect the actuation of the first named slide, substantially as described.

In testimony whereof I affix my signature in presence of two witnesses.

JAMES G. OLIVER.

Witnesses:
JAS. C. WESTOVER,
J. R. MESKINEY.

---

Copies of this patent may be obtained for five cents each, by addressing the "Commissioner of Patents, Washington, D. C."